(12) United States Patent
Fang et al.

(10) Patent No.: US 9,696,570 B2
(45) Date of Patent: Jul. 4, 2017

(54) VCOM GENERATION CIRCUIT AND LIQUID CRYSTAL DISPLAY

(71) Applicant: Shenzhen China Star Optoelectronics Technology Co., Ltd., Shenzhen, Guangdong (CN)

(72) Inventors: Zhaolin Fang, Guangdong (CN); Dongsheng Guo, Guangdong (CN)

(73) Assignee: Shenzhen China Star Optoelectronics Technology Co., Ltd, Shenzhen, Guangdong (CN)

(*) Notice: Subject to any disclaimer, the term of this patent is extended or adjusted under 35 U.S.C. 154(b) by 30 days.

(21) Appl. No.: 14/901,038

(22) PCT Filed: Apr. 3, 2015

(86) PCT No.: PCT/CN2015/075921
§ 371 (c)(1),
(2) Date: Dec. 27, 2015

(87) PCT Pub. No.: WO2016/141615
PCT Pub. Date: Sep. 15, 2016

(65) Prior Publication Data
US 2017/0038624 A1  Feb. 9, 2017

(30) Foreign Application Priority Data

Mar. 10, 2015  (CN) .......................... 2015 1 0104439

(51) Int. Cl.
*H03B 1/00* (2006.01)
*H03K 3/00* (2006.01)
*G02F 1/133* (2006.01)
*G05F 3/16* (2006.01)
*G02F 1/1368* (2006.01)

(52) U.S. Cl.
CPC ............ *G02F 1/13306* (2013.01); *G05F 3/16* (2013.01); *G02F 1/1368* (2013.01)

(58) Field of Classification Search
USPC .................................................. 327/108–112
See application file for complete search history.

(56) References Cited

U.S. PATENT DOCUMENTS 7,378,882 B2 * 5/2008 Kimura ................ G09G 3/3283
327/108
2005/0140400 A1 * 6/2005 Yi ........................ G09G 3/3655
327/108

(Continued)

*Primary Examiner* — Adam Houston
(74) *Attorney, Agent, or Firm* — Andrew C. Cheng

(57) ABSTRACT

Disclosed are a VCOM generation circuit and a liquid crystal display. The VCOM generation circuit has a voltage divider circuit coupled between a power source input end of the VCOM generation circuit and a ground, and a voltage output end; an operational amplifier output circuit, and one input end is coupled to the voltage output end of the voltage divider circuit, and an output end is a VCOM input end of a liquid crystal display, employed for outputting a liquid crystal drive reference voltage VCOM as the liquid crystal display functions to charge a liquid crystal layer; a delay circuit, coupled between the one input end of the operational amplifier output circuit and the ground, and employed for delaying a change rate of the VCOM as the operational amplifier output circuit outputs the VCOM.

11 Claims, 2 Drawing Sheets

(56) References Cited

U.S. PATENT DOCUMENTS

| | | | | |
|---|---|---|---|---|
| 2008/0036751 A1* | 2/2008 | Yamazaki | ............. | G06F 3/0412 345/205 |
| 2011/0260758 A1* | 10/2011 | Huang | ................ | H03F 3/45192 327/109 |
| 2012/0025876 A1* | 2/2012 | Kimura | ................ | G09G 3/3233 327/109 |
| 2012/0049901 A1* | 3/2012 | Takewaki | ........... | H03K 19/0016 327/109 |
| 2013/0293523 A1* | 11/2013 | Chan | ................... | G02B 26/001 345/212 |
| 2015/0123718 A1* | 5/2015 | Kouno | ................ | H01L 29/7397 327/109 |
| 2015/0333737 A1* | 11/2015 | Wang | ................... | G09G 3/3696 345/92 |
| 2016/0112046 A1* | 4/2016 | Wu | ................... | H03K 19/01850 327/108 |
| 2016/0164514 A1* | 6/2016 | Xiao | ................... | H03K 17/687 327/109 |
| 2016/0173065 A1* | 6/2016 | Kim | ...................... | H03K 3/012 327/109 |
| 2016/0191052 A1* | 6/2016 | Kimura | ............... | H03K 17/145 327/109 |
| 2017/0038624 A1* | 2/2017 | Fang | ....................... | G02F 1/133 |

* cited by examiner

VCOM GENERATION CIRCUIT AND LIQUID CRYSTAL DISPLAY

CROSS REFERENCE

This application claims the priority of Chinese Patent Application No. 201510104439.3, entitled "VCOM generation circuit and liquid crystal display", filed on Mar. 10, 2015, the disclosure of which is incorporated herein by reference in its entirety.

FIELD OF THE INVENTION

The present invention relates to a display technology field, and more particularly to a VCOM generation circuit and a liquid crystal display.

BACKGROUND OF THE INVENTION

A common display on the market is the Thin Film transistors (TFT) liquid crystal display. Each pixel dot in the TFT liquid crystal display comprises at least one TFT and one layer of liquid crystal material. The twist of liquid crystal molecules is controlled with the on and off of the TFT to change the transmittance of the liquid crystal molecules.

In each pixel, the two ends of the liquid crystal material layer are respectively coupled to one end of the TFT and the input end of the liquid crystal drive reference voltage VCOM. When a voltage exists between the two ends of the liquid crystal layer, i.e. the voltage levels between the aforesaid one end of the TFT and the input end of the VCOM are not consistent, the liquid crystal layer may be slightly or completely pervious to light. The corresponding pixel will possess certain brightness or light up completely; on the contrary, as the voltage levels at the two ends of the liquid crystal layer are consistent, the liquid crystal layer is opaque and the corresponding pixel does not display. The on or off of the TFT is controlled by the gate voltage VG of the TFT. The gate voltage VG is commonly generated by VAA voltage of the power source input end being charged or discharged with a charge pump. The VCOM is generally obtained by dividing the VAA voltage.

In prior arts, as the liquid crystal display powers on and with the hysteretic nature of the charge pump, the rising of VG lags behind the rising of VCOM. After VCOM has already risen up in stabilization, VG temporarily remains to be at low voltage level. The liquid crystal layer will be slightly pervious to light due to the voltage existing at the two ends. The back light source is lightened up later. Before the display powers on successfully, the ambient light makes the liquid crystal display appear to be in a gleaming state because the liquid crystal layer is slightly pervious to light. Such gleaming state can easily make the user misunderstand that the display may have quality issue or malfunction happens. It does not merely affect the user's experience and even influences the production sales of the displays.

SUMMARY OF THE INVENTION

The embodiment of the present invention provides a VCOM generation circuit and a liquid crystal display for solving the issue of gleaming state as the liquid crystal display powers on the machine screen.

The embodiment of the present invention provides a VCOM generation circuit in one aspect, comprising:

a voltage divider circuit, and the voltage divider circuit is coupled between a power source input end of the VCOM generation circuit and a ground, and the voltage divider circuit comprises a voltage output end;

an operational amplifier output circuit, and one input end of the operational amplifier output circuit is coupled to the voltage output end of the voltage divider circuit, and an output end of the operational amplifier output circuit is a VCOM input end of a liquid crystal display, employed for outputting a liquid crystal drive reference voltage VCOM as the liquid crystal display functions to charge a liquid crystal layer in the liquid crystal display;

a delay circuit, and the delay circuit is coupled between the one input end of the operational amplifier output circuit and the ground, and employed for delaying a change rate of the VCOM as the VCOM outputted by the operational amplifier output circuit changes.

Optionally, the VCOM generation circuit further comprises a discharge circuit, wherein:

the discharge circuit is coupled between an output end of the operational amplifier output circuit and the ground, employed for providing a discharge route for the liquid crystal layer as the liquid crystal display powers off.

Optionally, the operational amplifier output circuit comprises an operational amplifier OP and a first capacitor C1, and the delay circuit comprises a second capacitor C2, wherein:

an non inverting input of the operational amplifier OP is coupled to the voltage output end of the voltage divider circuit, and an inverting input end of the operational amplifier OP is coupled to an output end of the operational amplifier OP, and the output end of the operational amplifier OP is coupled to the ground via the first capacitor C1;

one end of the second capacitor C2 is coupled to the non inverting input of the operational amplifier OP, and the other end is coupled to the ground.

Optionally, the discharge circuit comprises a first resistor R1, and one end of the first resistor R1 is coupled to the output end of the operational amplifier output circuit, and the other end is coupled to the ground.

Optionally, the voltage divider circuit comprises a second resistor R2, a third resistor R3 and an adjustable resistor Rv, wherein:

the power source input end of the VCOM generation circuit is coupled to the ground sequentially via the second resistor R2, the adjustable resistor Rv and the third resistor R3 which are coupled in series;

the voltage output end of the voltage divider circuit is led out from the adjustable resistor Rv.

The embodiment of the present invention provides a liquid crystal display in another aspect, and the liquid crystal display comprises a VCOM generation circuit in any one of the embodiment of the present invention in the one aspect, a back light source and a liquid crystal panel, wherein the liquid crystal panel is coupled to the VCOM generation circuit, and the back light source is positioned behind the liquid crystal panel;

Optionally, the back light source comprises a light-emitting diode LED array and a light guide plate, wherein:

the light guide plate is positioned between the LED array and the liquid crystal panel; or the light guide plate and the LED array are positioned side by side behind the liquid crystal panel and the LED array is positioned at a lateral side of the light guide plate.

In the embodiment of the present invention, the delay circuit can delay a change rate of the VCOM. As the liquid crystal display powers on, the rising of VCOM lags behind the rising of VAA, but approaches or synchronizes with the rising of the TFT gate voltage VG controlling on and off of the liquid crystal. It prevents the voltage exists between the two ends of the liquid crystal layer before the TFT is activated to make the liquid crystal layer be opaque before the liquid crystal display stats to function. Accordingly, the issue of gleaming state before the liquid crystal display powers on is solved.

BRIEF DESCRIPTION OF THE DRAWINGS

In order to more clearly illustrate the embodiments of the present invention or prior art, the following figures will be described in the embodiments are briefly introduced. It is obvious that the drawings are merely some embodiments of the present invention, those of ordinary skill in this field can obtain other figures according to these figures without paying the premise.

DETAILED DESCRIPTION OF PREFERRED EMBODIMENTS

Embodiments of the present invention are described in detail with the technical matters, structural features, achieved objects, and effects with reference to the accompanying drawings as follows. It is clear that the described embodiments are part of embodiments of the present invention, but not all embodiments. Based on the embodiments of the present invention, all other embodiments to those of ordinary skill in the premise of no creative efforts obtained, should be considered within the scope of protection of the present invention.

The embodiment of the present invention provides a VCOM generation circuit and a liquid crystal display for preventing the issue of gleaming state as the liquid crystal display powers on. The present invention will be further described in detail with the accompanying drawings and the specific embodiments.

Figure 1:
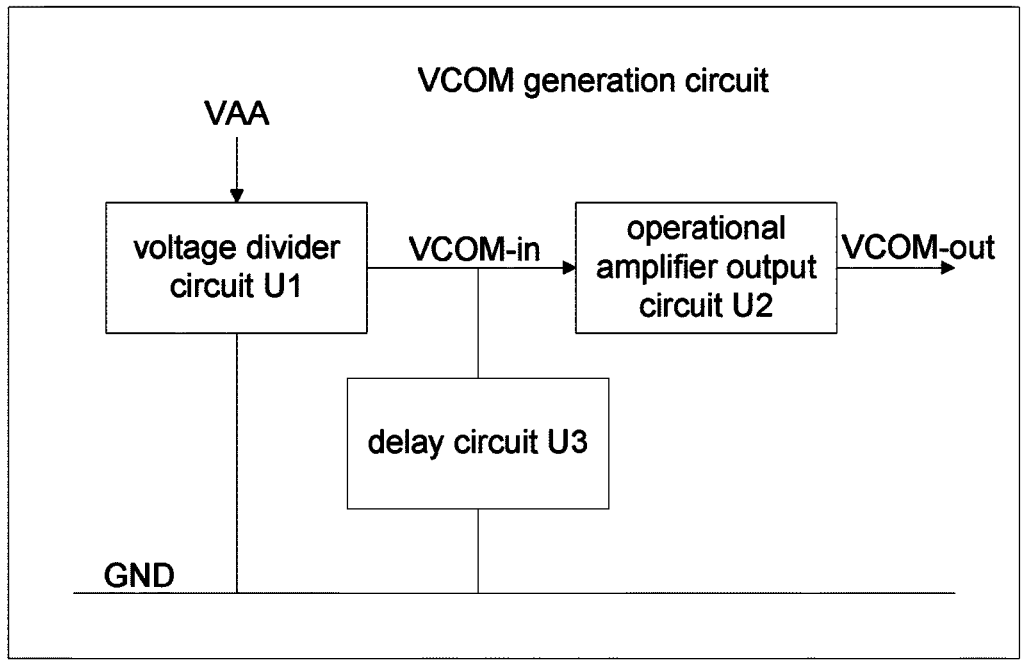
FIG. 1 is a structural diagram of a VCOM generation circuit provided by one embodiment of the present invention.

Please refer to FIG. 1, which is a structural diagram of a VCOM generation circuit provided by one embodiment of the present invention. As shown in FIG. 1, the VCOM generation circuit comprises a voltage divider circuit U1, an operational amplifier output circuit U2 and a delay circuit U3, wherein:

The voltage divider circuit U1 is coupled between a power source input end of the VCOM generation circuit and a ground GND, and the voltage divider circuit U1 comprises a voltage output end; one input end VCOM-in of the operational amplifier output circuit U2 is coupled to the voltage output end of the voltage divider circuit U1, and an output end VCOM-out of the operational amplifier output circuit U2 is a VCOM input end of a liquid crystal display, employed for outputting a liquid crystal drive reference voltage VCOM as the liquid crystal display functions to charge a liquid crystal layer in the liquid crystal display; the delay circuit U3 is coupled between the one input end VCOM-in of the operational amplifier output circuit U2 and the ground GND, and employed for delaying a change rate of the VCOM as the liquid crystal drive reference voltage VCOM outputted by the operational amplifier output circuit U2 changes.

In the specific embodiment, one end of the liquid crystal layer in the liquid crystal display is coupled to the output end VCOM-out of the operational amplifier output circuit U2, and the other end of the liquid crystal layer is coupled to the drain of the TFT element. As the liquid crystal display powers on, and VCOM rises up to a stable value, the gate voltage VG of the TFT element gradually rises. When the gate voltage VG rises up to the activation voltage VGH of the TFT, the TFT will be conducted. The liquid crystal display accomplishes the power on and starts to function. In prior art, VCOM is obtained by dividing the voltage VAA inputted by the power source input end. The rising of VCOM synchronizes with the rising of VAA, but the rising of VG lags behind the rising of VAA. Before VG rises up to VGH, the one end of the liquid crystal layer coupled to the TFT has not data to be written and is at low voltage level but the voltage level of the other end of the liquid crystal layer has already risen up to VCOM after stabilization. Because the voltage difference between the two ends, the liquid crystal layer can be slightly pervious to light. The ambient light passes through the liquid crystal layer and makes the liquid crystal display appears to be in a gleaming state.

In the embodiment of the VCOM generation circuit according to the present invention, a delay circuit U3 is added, which can delay a change rate of the VCOM. As the liquid crystal display powers on, the rising of VCOM also lags behind the rising of VAA, but approaches or synchronizes with the rising of the TFT gate voltage VG. It prevents the voltage exists between the two ends of the liquid crystal layer before the TFT is activated to make the liquid crystal layer be opaque before the liquid crystal display stats to function. Accordingly, the issue of gleaming state before the liquid crystal display powers on is solved.

Figure 2:
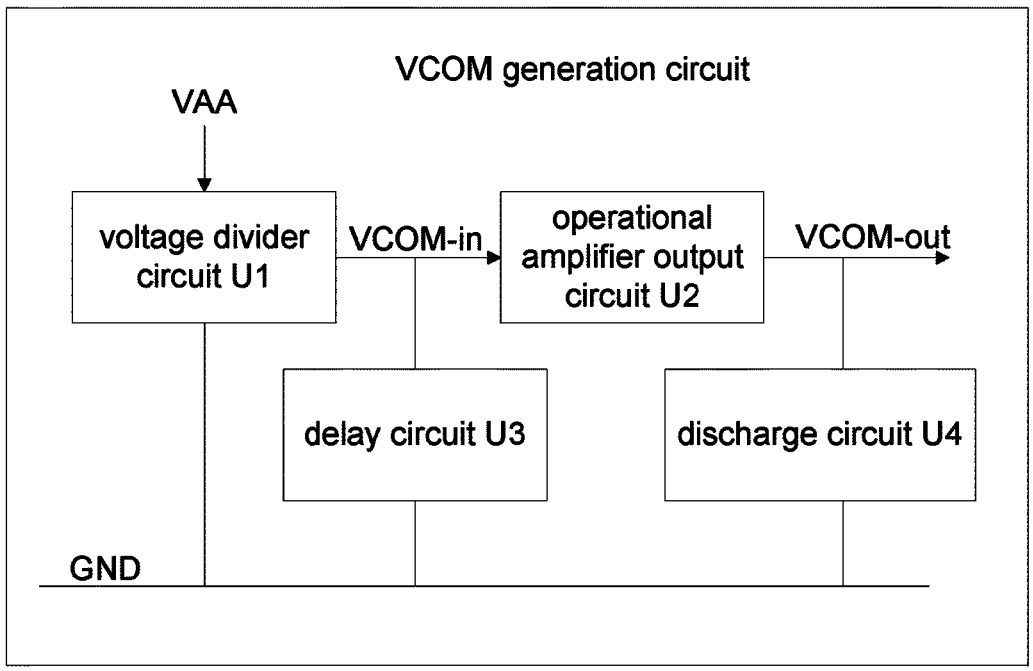
FIG. 2 is a structural diagram of a VCOM generation circuit provided by another embodiment of the present invention.

Please refer to FIG. 2, which is a structural diagram of a VCOM generation circuit provided by another embodiment of the present invention. As shown in FIG. 2, on the basis of FIG. 1, the VCOM generation circuit can further comprise a discharge circuit U4. The discharge circuit U4 is coupled between the output end VCOM-out of the operational amplifier output circuit U2 and the ground GND, employed for providing a discharge route for the liquid crystal layer as the liquid crystal display powers off. Specifically, the liquid crystal material possesses capacitive property. The liquid crystal layer will be charged as the liquid crystal display functions. The liquid crystal layer will be slowly discharged as the liquid crystal display powers off. When the discharge of the liquid crystal layer is accomplished, the power off of the liquid crystal display is succeeded. During the discharge period of the liquid crystal layer, the liquid crystal layer remains to have a certain light transmission to make the liquid crystal display to be in a gleaming state during the power off procedure. The discharge circuit U4 can provide a discharge route for the liquid crystal layer as the liquid crystal display powers off. The accumulated charge of the liquid crystal layer can be rapidly released to speed up the descent rate of VCOM and to make the liquid crystal display power off quickly.

Figure 3:
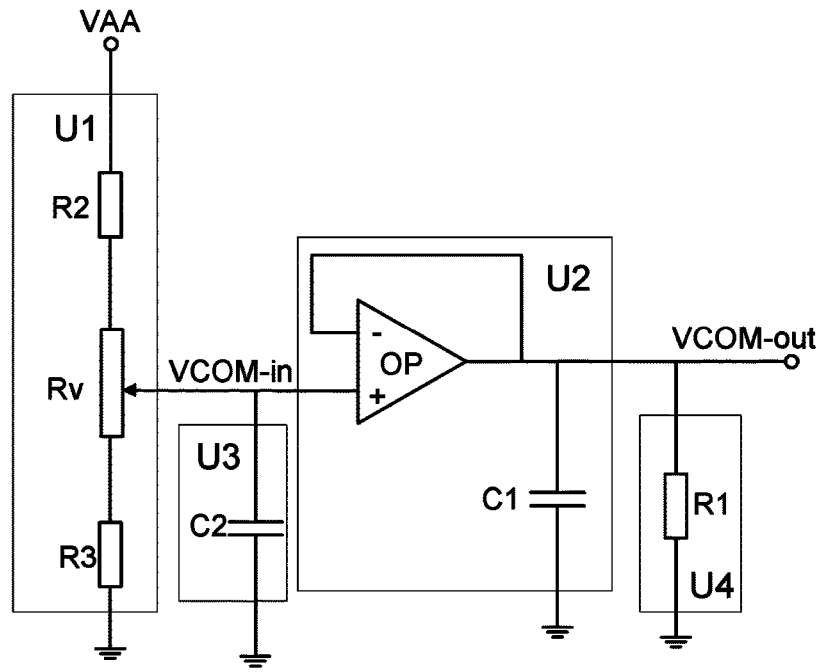
FIG. 3 is a circuit diagram of a VCOM generation circuit provided by one embodiment of the present invention.

Please refer to FIG. 3, together. As shown in FIG. 3, the operational amplifier output circuit U2 comprises an operational amplifier OP and a first capacitor C1, and the delay circuit comprises a second capacitor C2, wherein:

An non inverting input of the operational amplifier OP is coupled to the voltage output end of the voltage divider circuit U1, and an inverting input end of the operational amplifier OP is coupled to the output end VCOM-out of the operational amplifier OP, and the output end VCOM-out of the operational amplifier OP is coupled to the ground via the first capacitor C1; one end of the second capacitor C2 is coupled to the non inverting input of the operational amplifier OP, and the other end is coupled to the ground.

The discharge circuit U4 comprises a first resistor R1, and one end of the first resistor R1 is coupled to the output end VCOM-out of the operational amplifier output circuit U2, and the other end is coupled to the ground.

The voltage divider circuit U1 comprises a second resistor R2, a third resistor R3 and an adjustable resistor Rv, wherein:

the power source input end of the VCOM generation circuit is coupled to the ground sequentially via the second resistor R2, the adjustable resistor Rv and the third resistor R3 which are coupled in series; the voltage output end of the voltage divider circuit is led out from the adjustable resistor Rv.

In the specific implementation, the voltage VAA inputted by the power source input end is divided by the second resistor R2, the adjustable resistor Rv and the third resistor R3, and the voltage output end of the voltage divider circuit is led out from the adjustable resistor Rv. The voltage of the power source input end is inputted in the non inverting input of the operational amplifier OP and outputted by the operational amplifier OP. The non inverting input of the operational amplifier OP is coupled to the ground via the second capacitor C2. With the property that the voltage of the two ends of the second capacitor C2 cannot suddenly change, as the liquid crystal display powers on and VAA suddenly increases, the input voltage of the operational amplifier OP will not suddenly change along with the increase of VAA, and instead it lags behind the change of VAA and gradually increases. The output voltage VCOM of the operational amplifier OP will gradually increase. Thus, the change rate of the VCOM can be delayed to make the change rate of the VCOM and the change rate of the VG begin to converge. When VG rises up to VGH, VCOM also rises up to a stable value and the liquid crystal display starts to function normally. Then, VGH and VCOM charge the liquid crystal layer. When the liquid crystal display powers off, the liquid crystal layer starts to be discharged. One end of the first resistor R1 is coupled to one end of the liquid crystal layer and the other end of the first resistor R1 is coupled to the ground to provide a discharge route for the liquid crystal layer. The accumulated charge on the liquid crystal layer can be rapidly conducted to the ground via the first resistor R1 to shorten the discharge period of the liquid crystal layer after power off to prevent that the liquid crystal layer remains to have a certain light transmission to make the liquid crystal display to be in a gleaming state after power off.

Correspondingly, the embodiment of the present invention further provides a liquid crystal display.

Figure 4:
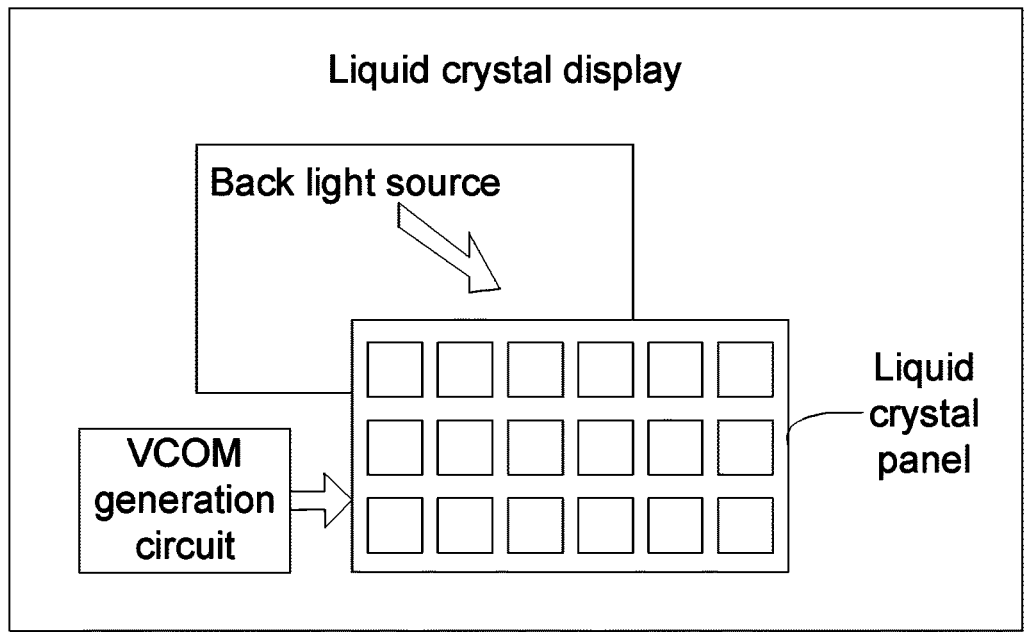
FIG. 4 is a structural diagram of a liquid crystal display provided by one embodiment of the present invention.

Please refer to FIG. 4, which is a structural diagram of a liquid crystal display provided by one embodiment of the present invention. As shown in FIG. 4, the liquid crystal display can comprise a VCOM generation circuit in any one of the embodiment shown in FIGS. 1-3, and further comprise a back light source and a liquid crystal panel, wherein the liquid crystal panel is coupled to the VCOM generation circuit, and the back light source is positioned behind the liquid crystal panel.

Specifically, the liquid crystal panel can be accomplished by assembling multiple layer materials, such as the front and rear substrates, a plurality of TFT elements, electrodes, liquid crystal material layer, color filter, polarizer and et cetera. In specific embodiment, the liquid crystal display can further comprise a drive circuit. The aforesaid VCOM generation circuit can be independent from the drive circuit or be a portion of the drive circuit.

As being a possible embodiment, the back light source comprises a light-emitting diode LED array and a light guide plate, wherein, optionally, the light guide plate can be positioned between the LED array and the liquid crystal panel, and the back light source is a direct light type beck light source; or the light guide plate and the LED array are positioned side by side behind the liquid crystal panel and the LED array is positioned at a lateral side of the light guide plate, and the back light source is a side light type beck light source.

Above are embodiments of the present invention, which does not limit the scope of the present invention. Any modifications, equivalent replacements or improvements within the spirit and principles of the embodiment described above should be covered by the protected scope of the invention.

What is claimed is:

1. A liquid crystal drive reference voltage VCOM generation circuit, comprising:

a voltage divider circuit, and the voltage divider circuit is coupled between a power source input end of the VCOM generation circuit and a ground, and the voltage divider circuit comprises a voltage output end;

an operational amplifier output circuit, and one input end of the operational amplifier output circuit is coupled to the voltage output end of the voltage divider circuit, and an output end of the operational amplifier output circuit is a VCOM input end of a liquid crystal display, employed for outputting a liquid crystal drive reference voltage VCOM as the liquid crystal display functions to charge a liquid crystal layer in the liquid crystal display;

a delay circuit, and the delay circuit is coupled between the one input end of the operational amplifier output circuit and the ground, and employed for delaying a change rate of the VCOM as the VCOM outputted by the operational amplifier output circuit changes.

2. The VCOM generation circuit according to claim 1, wherein the VCOM generation circuit further comprises a discharge circuit, wherein:

the discharge circuit is coupled between an output end of the operational amplifier output circuit and the ground, employed for providing a discharge route for the liquid crystal layer as the liquid crystal display powers off.

3. The VCOM generation circuit according to claim 2, wherein the operational amplifier output circuit comprises an operational amplifier OP and a first capacitor C1, and the delay circuit comprises a second capacitor C2, wherein:

a non inverting input of the operational amplifier OP is coupled to the voltage output end of the voltage divider circuit, and an inverting input end of the operational amplifier OP is coupled to an output end of the operational amplifier OP, and the output end of the operational amplifier OP is coupled to the ground via the first capacitor C1;

one end of the second capacitor C2 is coupled to the non inverting input of the operational amplifier OP, and the other end is coupled to the ground.

4. The VCOM generation circuit according to claim 2, wherein the discharge circuit comprises a first resistor R1, and one end of the first resistor R1 is coupled to the output end of the operational amplifier output circuit, and the other end is coupled to the ground.

5. The VCOM generation circuit according to claim 1, wherein the voltage divider circuit comprises a second resistor R2, a third resistor R3 and an adjustable resistor Rv, wherein:
the power source input end of the VCOM generation circuit is coupled to the ground sequentially via the second resistor R2, the adjustable resistor Rv and the third resistor R3 which are coupled in series;
the voltage output end of the voltage divider circuit is led out from the adjustable resistor Rv.

6. A liquid crystal display, wherein the liquid crystal display comprises a VCOM generation circuit, a back light source and a liquid crystal panel, wherein the liquid crystal panel is coupled to the VCOM generation circuit, and the back light source is positioned behind the liquid crystal panel;
the VCOM generation circuit comprises:
a voltage divider circuit, and the voltage divider circuit is coupled between a power source input end of the VCOM generation circuit and a ground, and the voltage divider circuit comprises a voltage output end;
an operational amplifier output circuit, and one input end of the operational amplifier output circuit is coupled to the voltage output end of the voltage divider circuit, and an output end of the operational amplifier output circuit is a VCOM input end of a liquid crystal display, employed for outputting a liquid crystal drive reference voltage VCOM as the liquid crystal display functions to charge a liquid crystal layer in the liquid crystal display;
a delay circuit, and the delay circuit is coupled between the one input end of the operational amplifier output circuit and the ground, and employed for delaying a change rate of the VCOM as the VCOM outputted by the operational amplifier output circuit changes.

7. The liquid crystal display according to claim 6, wherein the back light source comprises a light-emitting diode LED array and a light guide plate, wherein:
the light guide plate is positioned between the LED array and the liquid crystal panel; or the light guide plate and the LED array are positioned side by side behind the liquid crystal panel and the LED array is positioned at a lateral side of the light guide plate.

8. The liquid crystal display according to claim 6, wherein the VCOM generation circuit further comprises a discharge circuit, wherein:
the discharge circuit is coupled between an output end of the operational amplifier output circuit and the ground, employed for providing a discharge route for the liquid crystal layer as the liquid crystal display powers off.

9. The liquid crystal display according to claim 8, wherein the operational amplifier output circuit comprises an operational amplifier OP and a first capacitor C1, and the delay circuit comprises a second capacitor C2, wherein:
a non inverting input of the operational amplifier OP is coupled to the voltage output end of the voltage divider circuit, and an inverting input end of the operational amplifier OP is coupled to an output end of the operational amplifier OP, and the output end of the operational amplifier OP is coupled to the ground via the first capacitor C1;
one end of the second capacitor C2 is coupled to the non inverting input of the operational amplifier OP, and the other end is coupled to the ground.

10. The liquid crystal display according to claim 8, wherein the discharge circuit comprises a first resistor R1, and one end of the first resistor R1 is coupled to the output end of the operational amplifier output circuit, and the other end is coupled to the ground.

11. The liquid crystal display according to claim 6, wherein the voltage divider circuit comprises a second resistor R2, a third resistor R3 and an adjustable resistor Rv, wherein:
the power source input end of the VCOM generation circuit is coupled to the ground sequentially via the second resistor R2, the adjustable resistor Rv and the third resistor R3 which are coupled in series;
the voltage output end of the voltage divider circuit is led out from the adjustable resistor Rv.

\* \* \* \* \*